United States Patent [19]

Onishi et al.

[11] Patent Number: 5,403,511
[45] Date of Patent: Apr. 4, 1995

[54] FERROELECTRIC LIQUID CRYSTAL COMPOSITION AND FERROELECTRIC LIQUID CRYSTAL DISPLAY DEVICE

[75] Inventors: Hiroyuki Onishi, Ikeda; Kazuhiro Johten, Hirakata; Tsuyoshi Uemura, Kadoma; Takao Sakurai, Kawasaki; Naoko Mikami, Kawasaki; Tadahiko Yokota, Kawasaki, all of Japan

[73] Assignee: Matsushita Electric Industrial Co., Ltd., Osaka, Japan

[21] Appl. No.: 908,605

[22] Filed: Jun. 29, 1992

Related U.S. Application Data

[63] Continuation of Ser. No. 485,085, Feb. 26, 1990, abandoned.

[30] Foreign Application Priority Data

Feb. 27, 1989 [JP] Japan .................................... 1-49573

[51] Int. Cl.⁶ .................. C09K 19/52; C09K 19/06; C09K 19/58; G02F 1/13
[52] U.S. Cl. .................. 252/299.010; 252/299.6; 252/299.2; 252/299.61
[58] Field of Search .............. 252/299.01, 299.6, 299.2, 252/299.61

[56] References Cited

U.S. PATENT DOCUMENTS

| | | | |
|---|---|---|---|
| 3,941,849 | 3/1976 | Herold | 528/92 X |
| 4,042,293 | 8/1977 | Hanak et al. | 350/336 X |
| 4,917,472 | 4/1990 | Margerum et al. | 350/340 |
| 4,973,426 | 10/1990 | Ohno et al. | 252/299.66 |
| 5,122,296 | 6/1992 | Johten et al. | 252/299.5 |
| 5,240,637 | 8/1993 | Shinjo et al. | 252/299.61 |

FOREIGN PATENT DOCUMENTS

| | | |
|---|---|---|
| 52-108385 | 9/1977 | Japan . |
| 54-82388 | 6/1979 | Japan . |
| 57-204512 | 12/1982 | Japan ......................... 252/299.01 |
| 62-173438 | 7/1987 | Japan . |
| 63-163426 | 7/1988 | Japan . |
| 8808870 | 11/1988 | WIPO . |

OTHER PUBLICATIONS

Patent Abstracts of Japan, vol. 12, No. 431 (P-786), Nov. 15, 1988.
Patent Abstracts of Japan, vol. 3, No. 128 (C-62), Oct. 24, 1979.
Patent Abstracts of Japan, vol. 9, No. 078 (C-274), Apr. 6, 1985.
Journal Of Applied Phyaics, vol. 47, No. 6, Jun. 1976, pp. 2375-2381.
Molecular Crystals And Liquid Crystals, vol. 38, No. 1-4, 1977, pp. 219-228.
Journal Of The Electrochemical Society, vol. 124, 1977, pp. 1389-1394.

*Primary Examiner*—Robert L. Stoll
*Assistant Examiner*—C. Harris
*Attorney, Agent, or Firm*—Wenderoth, Lind & Ponack

[57] ABSTRACT

Characteristics of a ferroelectric liquid crystal show that ionic impurities deteriorate its display quality to a great extent. The present invention provides a ferroelectric liquid crystal display device of good display quality without the deterioration of display characteristics, as a result of trapping the ionic impurities effectively by adding an organic material which traps ions and which lowers conductivity of a liquid crystal layer thereto.

3 Claims, 7 Drawing Sheets

FERROELECTRIC LIQUID CRYSTAL COMPOSITION AND FERROELECTRIC LIQUID CRYSTAL DISPLAY DEVICE

This application is a continuation of application Ser. No. 07/485,085, filed Feb. 26, 1990, abandoned.

BACKGROUND OF THE INVENTION

1. Field of the Invention

The present invention relates to a liquid crystal composition and a liquid crystal display device having bistability, and especially relates to a ferroelectric liquid crystal composition and a ferroelectric liquid crystal display device.

2. Description of the Prior Art

These days, liquid crystal display devices have been widely used for both consumer equipment and office automation equipment such as portable TVs and laptop computers or the like, and now are successively replacing the CRT display devices. At present, the STN liquid crystal of double layer type utilizing a nematic liquid crystal is a main stream in the related market, but it has many problems with regard to response time, angle of view, and display capacity. On the contrary, ferroelectric liquid crystal has some excellent characteristics such as quick response and a large memory storage or the like which can not be found in the nematic liquid crystal. So, research and development about the ferroelectric liquid crystal have been actively conducted in order to produce a display of the next generation of large display capacity and with high definition.

FIG. 1 shows a schematic view of the ferroelectric liquid crystal. The ferroelectric liquid crystal has a layer structure usually called a smectic liquid crystal, and its liquid crystal molecules have such a structure that the molecules are tilted in the direction of a layer normal at a tilt angle $\theta$. In FIG. 1, numeral 1 indicates a ferroelectric liquid crystal molecule, 2 indicates a cone, 3 (P) indicates a spontaneous polarization, 4 indicates a layer structure, and Z indicates a direction of a layer normal.

As shown in FIG. 1, the ferroelectric liquid crystal molecule can move freely on the cone (conical shape) titled in the direction of the layer normal at $\theta$ degrees, and longitudinal directions of the molecules are specific in each of the layers, so that the molecules as a whole have a twisted configuration.

The ferroelectric liquid crystal molecule is an optically active liquid crystal molecule which is not a racemic modification, and has the spontaneous polarization 3 running in a direction perpendicular to the longitudinal direction of the molecule. Accordingly, the molecule rotates back and forth around the layer normal in $2\theta$ degrees alternatively depending upon the direction of an applied electric field. According to these two states of the molecules, either the bright or the dark can be displayed with a polarizer.

FIGS. 2A–2H show display modes of the ferroelectric liquid crystal and changes of brightness. A numeral 5 indicates an upper surface of a glass substrate, and 6 indicates a lower surface of the glass substrate. In FIG. 2A, the electric field is applied in the direction from the lower substrate toward the upper substrate and all the spontaneous polarizations extend upward uniformly. In FIG. 2B, the electric field is applied from the upper substrate to the lower substrate, and all the spontaneous polarizations extend downward uniformly. Each state of the molecules will remain even if the electric field is cut off. As shown in FIGS. 2A and 2B, idealistically perfect is such a switching between two uniform states in which all the long axis 1 of the molecules arranged from the top to the bottom extend in the same direction, but in practice the long axes of the molecules at the upper surface and at the lower surface are in a twisted position with each other by $2\theta$ degrees as shown in FIGS. 2C and 2D affected by alignment layers and liquid crystal materials or the like, and the molecules therebetween are twisted with one another. This state is called 'twist state'. There are thus a switching between a twist state and another twist state, and another switching between a uniform state and a twist state, and in addition there is also a monostable state in which one uniform state becomes stable. FIG. 2E shows applying voltages and changes of the brightness at the switchings between the uniform states, FIG. 2F shows those between the twisted states, FIG. 2G shows those between the uniform state and the twist state, and FIG. 2H shows those at the monostable state. "o" shows the brightness just at applications of an electric field, and "x" shows the brightness during states of being stored. The brightness during the memory state is important at a practical working. In FIG. 2E, the sufficient changes of the brightness can be achieved both at the voltage applications and during the memory state, but the changes of the brightness during the memory state are not sufficient at both sides in FIG. 2F and at one side in FIG. 2G, and the brightness never changes in FIG. 2H. As described just above, the twist state and the monostable state prevent sufficient changes of the brightness and can not realize a favorable contrast.

There have been the following three problems about the conventional ferroelectric liquid crystal panel. The first is that it hardly has the switchings between the desirable uniform states and tends to have the switchings between the twist states or between the twist state and the uniform state so that it is difficult to achieve favorable contrast. The second is that a deterioration of threshold characteristics occurs after leaving it in the memory state, namely one uniform state, for a long time. The third is that a reset pulse having a pulse width wider than a selecting pulse has to be applied when a matrix waveform is applied so that its picture plane becomes dazzling. The reasons for this phenomenon have not been found yet, but it is assumed to be because of ionic impurities. As for controlling the ionic impurities, there are examples (Japanese Laid-Open Patent Publications No. 52-108385 and 54-82388) in which a variety of additives were added to a liquid crystal in order to prevent a deterioration of the liquid crystal caused by DC applications, more than ten years ago when a DSM (dynamic scattering mode) was performed utilizing the nematic liquid crystal. But at present day the ions do not have to be controlled in a TN mode and an STN mode utilizing the nematic liquid crystal because the liquid crystal is purified sufficiently and is driven only by AC. A TFT presently used in a liquid crystal TV or the like has a problem concerning a voltage retention time, so that there is an example (Japanese Laid-Open Patent Publication No. 62-173438) in which minute particles which have absorptivity are added to the liquid crystal in order to improve the voltage retention time, but it has a deterioration system different from that of the ferroelectric liquid crystal and this example is not effective for the ferroelectric liquid crystal.

As for controlling the ionic impurities in the ferroelectric liquid crystal, there has been a trial (Japanese Laid-Open Patent Publication No. 63-163426) to remove the ionic impurities by adding an inorganic metal to the liquid crystal. But the addition of these minute inorganic metallic particles brings about a dispersion of the metallic particles in the liquid crystal, and causes problems such as a disorder of a molecular alignment of the liquid crystal, a tendency that a crystallization can easily occur when the crystal remains at a low temperature using the particles as cores for the crystallization, and lowering of resistivity, so that the ionic impurities can not be controlled effectively and it is difficult to keep favorable characteristics.

In order to prevent the deterioration of the threshold characteristics of the ferroelectric liquid crystal panel, there is another trial (U.S. patent application Ser. No. 07/422,493 filed on Oct. 17, 1989) in which a compound of a primary amine and of a secondary amine or an epoxy compound are added to the crystal, and this method can effectively prevent the deterioration. But there are still possibilities of having the twisted state because of its high reactivity.

SUMMARY OF THE INVENTION

An object of the present invention is to provide a ferroelectric liquid crystal panel of an excellent display capability wherein the panel shows switchings between favorable uniform states from the beginning, and there are neither a deterioration phenomenon of threshold characteristics even after a long storage, nor dazzling.

In order to achieve the above object, the present invention provides a ferroelectric liquid crystal composition and ferroelectric liquid crystal display device wherein to the liquid crystal is added an organic material which traps ionic impurities in a liquid crystal layer, or an organic material which lowers conductivity of the liquid crystal. Each of such organic materials has a low reactivity to the liquid crystal. The present invention also provides a ferroelectric liquid crystal display device wherein one of the above organic materials is dispersed on a surface of an alignment layer or in the alignment layer.

The organic material is preferably one which lowers the conductivity of the liquid crystal layer, such as an electron donor and a chelate agent except for those of primary and secondary amines and of an epoxy, and further such as a heterocyclic compound which for example contains at least a nitrogen atom, an alcohol derivative, and an ether. As the ether, a compound having characteristics of the liquid crystal expressed by the following formulas is desirable.

R(—O—(CH$_2$)n)m—O—R in which R indicates an alkyl group, and n and m indicate natural numbers.

not including zero, A and B indicate single bonds or COO, OCO CH$_2$O or CHCH and

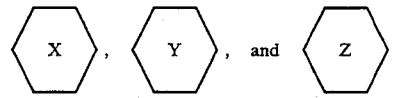

indicate a benzene ring, a pyrimidine ring, a pyridazine ring, a pyrazine ring, a pyridine ring, a cyclohexane ring, or a thiadiazole ring.

The above organic materials instead of inorganic metals are utilized as the material which traps the ions or which lowers the conductivity, and can trap the ions effectively according to a chelate effect and a hydrogen bond or the like in order to prevent lowering the resistivity. These materials also have a good compatibility (solubility) with the liquid crystal, so there is no disorder of a molecular alignment and the materials do not become cores of crystallization. Because molecular sizes of the organic materials are larger than those of the inorganic materials and can be freely chosen, influences of the ions can be effectively suppressed by lowering mobility of the trapped ions.

According to a constitution just described above, trapped are the ions mixed in the liquid crystal from the beginning, produced later as the liquid crystal is being deteriorated, and introduced from glasses, over-coating materials, the alignment layers, and sealants, so that a deterioration of threshold characteristics caused by the ions can be prevented, and so that a liquid crystal display device having excellent displaying capability can be achieved.

DESCRIPTION OF THE PREFERRED EMBODIMENTS

Figure 3:
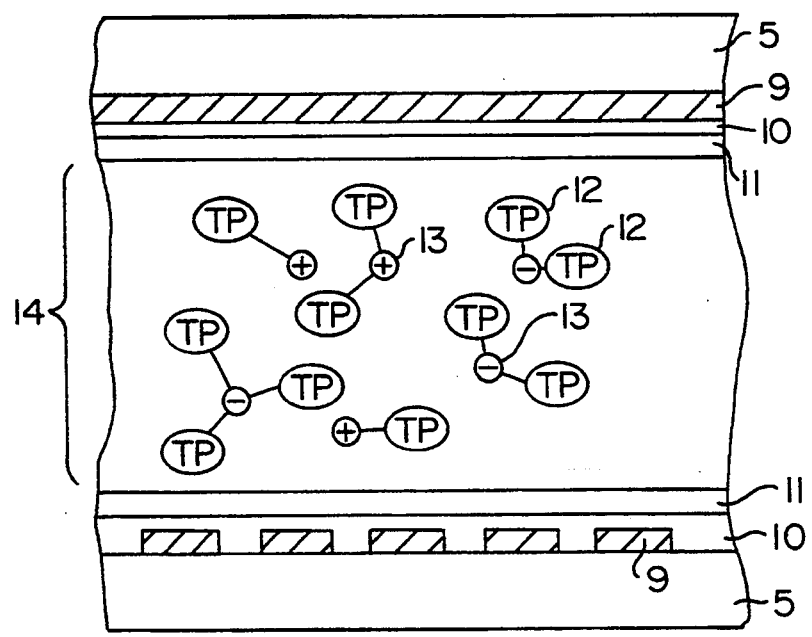
FIG. 3 is a diagrammatic view of an additive-added ferroelectric liquid crystal panel of the present invention.

In FIG. 3 is shown a diagrammatic view of a ferroelectric liquid crystal panel of the present invention. In FIG. 3, numeral 5 indicates glass substrates, 9 indicates transparent electrodes, 10 indicates insulating layers, 11 indicates alignment layers formed of organic layers or of inorganic layers, 12 indicates organic materials added

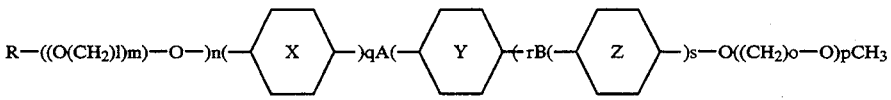

in which R indicates an alkyl group, l, m, and n indicate zero or natural numbers, o and p indicate natural numbers, at least any one of q, r, and s is a natural number to a liquid crystal layer of the present invention in order to trap ions or in order to lower a conductivity of the liquid crystal, and 13 indicates ionic impurities. The added organic materials 12 can be dispersed on the alignment layers 11 or in the alignment layers 11, and moreover the alignment layers 11 themselves can be composed of the organic materials 12.

As shown in the drawing, a ferroelectric liquid crystal composition and a ferroelectric liquid crystal display device using such liquid crystal composition contain an organic material which traps the ionic impurities existing in the liquid crystal layer, and thus can trap the ions effectively and/or can lower conductivity. Examples of ways to trap the ions are shown below.

(1) To trap anions by means of hydrogen bonding with compounds having $OH^-$ . . . Alcohol derivatives and polyhydric alcohol or the like.

(2) To trap metallic ions by means of crown ether or the like . . . A crown ether and a thiocrown ether or the like.

(3) To trap cations by means of compounds including anatoms (for example, N, S, and O) having a lone pair . . . An ether and various kinds of a chelating agent or the like, These are some examples of the ways of trapping the ions, but the invention is not limited to the above examples. Concrete examples of the organic materials to trap the ions are listed as follows:

The alcohol derivatives and the polyhydric alcohol such as a methanol, an ethylene glycol, and a triethylene glycol;

The chelating agent, the electron donor, and the heterocyclic compound such as an acetylacetone, a theonyltrifluoroacetone, a dibenzoylmethane, an alpha benzoin oxime, an O-oxyacetophenone, a 1-oxysanton, a pyromeconic acid, a tropolone, a quinone, an oxyquinone (such as an oxynaphthoquinone, a naphthazarin, an oxyanthraquinone, and an alizarin or the like), an oxyacid (a salicylic acid or the like), an oxyester (an acetoacetic ester), a diketone dioxime (a dimethylglyoxime), a 8-oxyquinoline, a 1-oxyacridine, a 10-oxybenzoquinoline, a 1-oxyphenazine, an oxyazobenzene, a nitrosonaphtol, an oxyquinoline N oxide, an amino acid, an anthranilic acid, a picolinic acid, a phenazine alpha carboxylic acid, a quinaldinic acid, a triazene, a buret, a formazane, a diphenylthiocarbazone, a dipyridil, a phenanthroline, a salicylaldehyde-o-oxyphenylimine, a luminol derivative, an oxyazocarboxylic acid, a terpyridil, an ammonia adiacetic acid, a bissalicylaldehyde ethylenediimine, a phthalocyanine, a porphin, a porphyrin, a trisalicylaldehyde diimine, a 1. 8. bissalicylidenum amino 3. 6. dithiaoctane, a cyclapentadienyl, an aldehyde, a ketone, an oxyketone, a phenol, a nitro compound, a carboxylic acid, an imine, a nitrile, an azo compound, a thioether, a thioketone, the heterocyclic compound, a carbonyl compound, and the ether.

These are some examples of the organic materials to trap the ions and/or to lower the conductivity of the liquid crystal and the present invention should not be limited to the above examples. Any such organic materials as the chelating agents having low reactivity with the liquid crystal, the electron donor, the alcohol derivatives, and the heterocyclic compound or the like can be used. The ionic impurities are trapped by adding these compounds, and the deterioration of the threshold characteristics or the like caused by the switchings between the twist states and between the uniform state and the twist state, by an uneven distribution of the ions under an influence of an internal electric field induced by a spontaneous polarization, and so on can be eliminated, so that a ferroelectric display device capable of displaying excellent pictures can be achieved.

Figure 1:
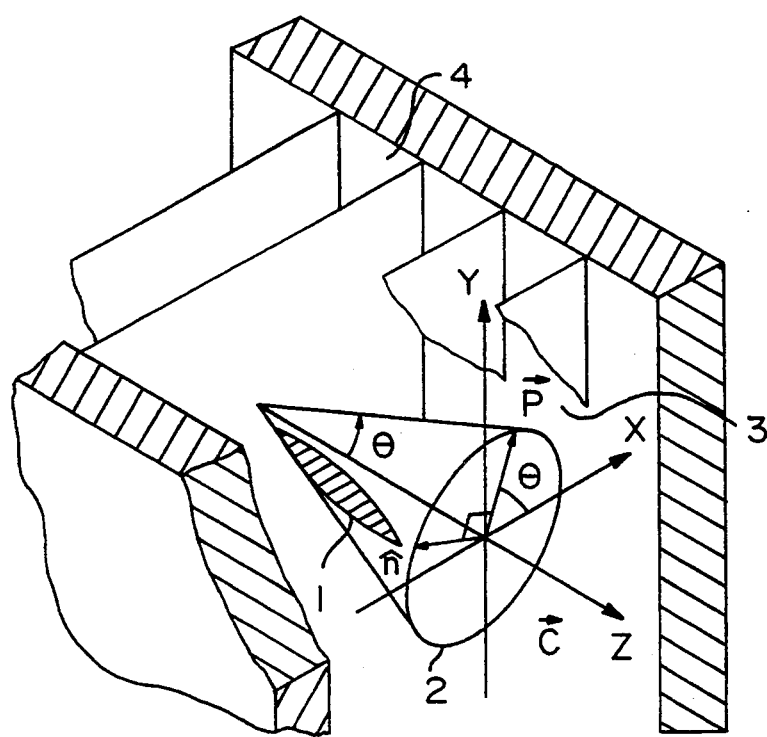
FIG. 1 is a diagrammatic view of a ferroelectric liquid crystal.
Figure 2A:
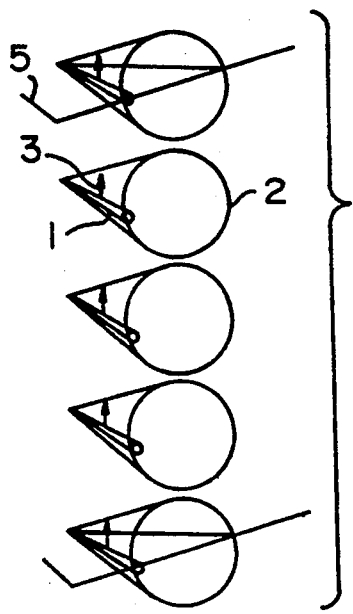
FIGS. 2A–2D are is diagrammatic views of a display mode of the ferroelectric liquid crystal.
Figure 2B:
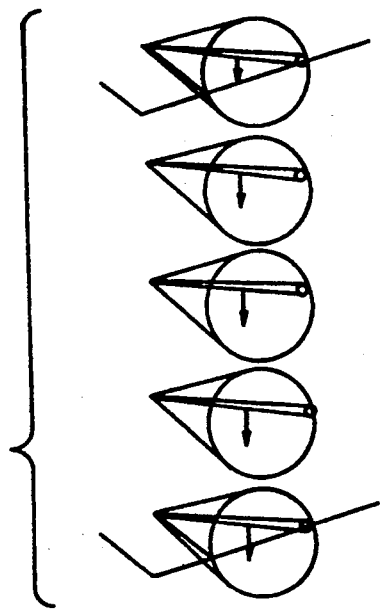
Figure 2C:
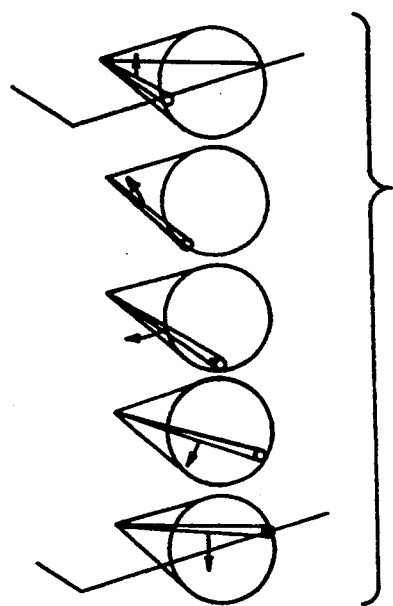
Figure 2D:
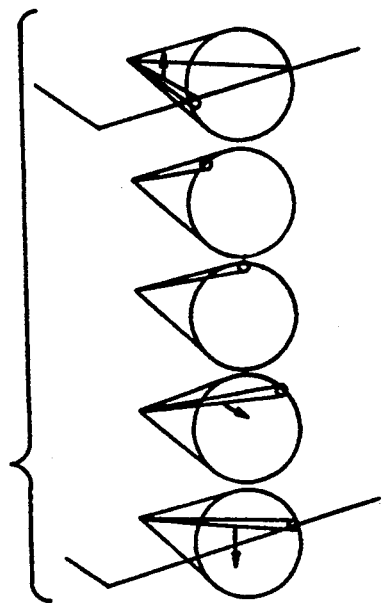
Figure 2E:
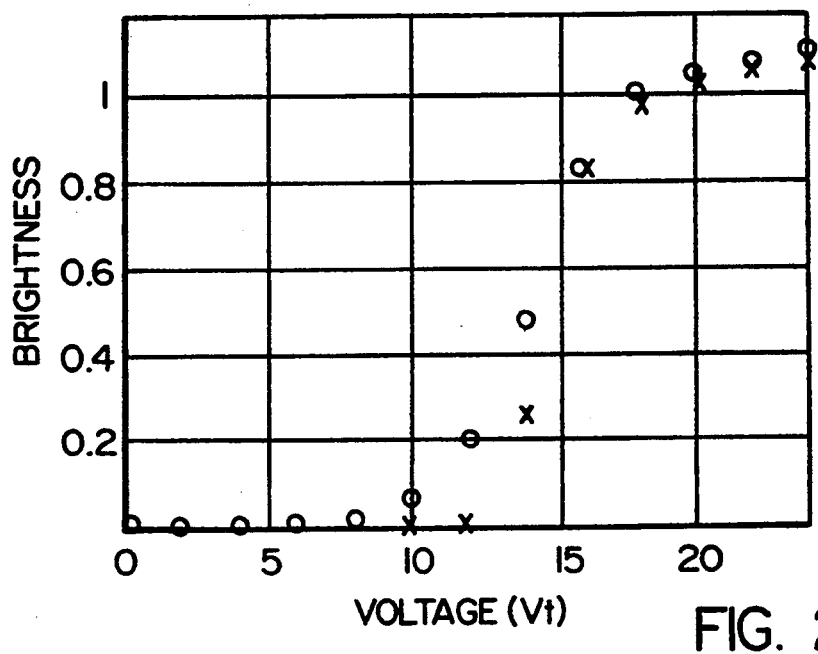
FIGS. 2E–2H are characteristic graphs of threshold characteristics at each display mode.
Figure 2F:
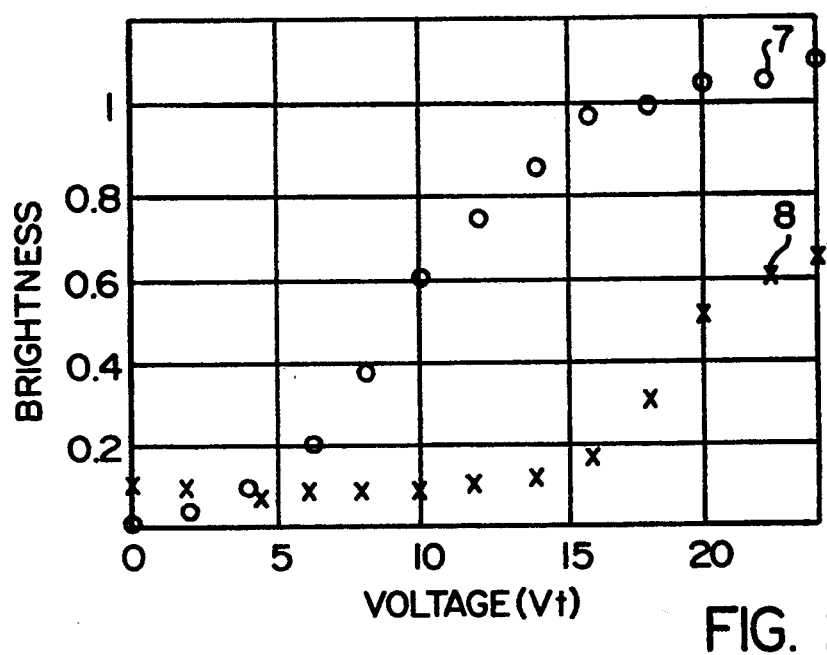
Figure 2G:
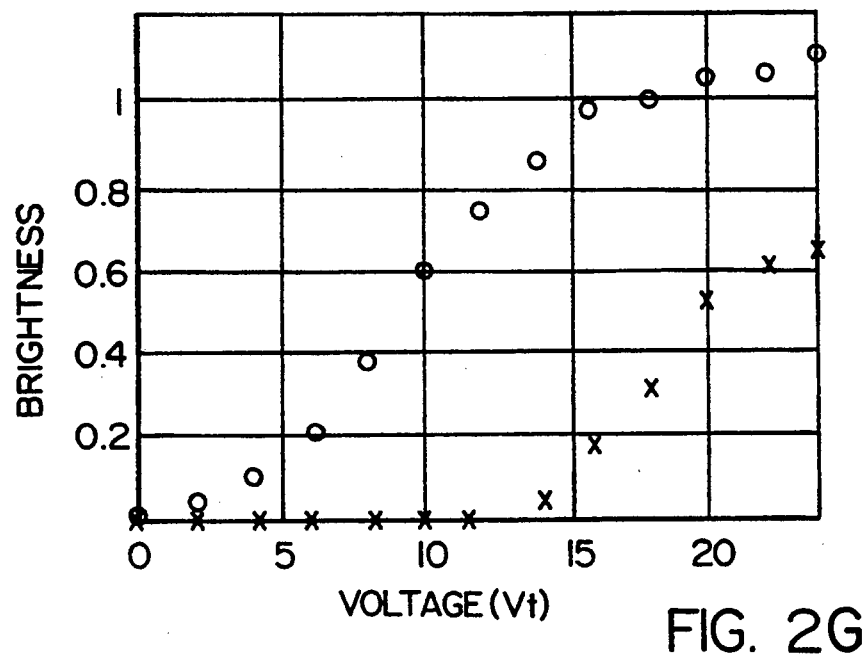
Figure 2H:
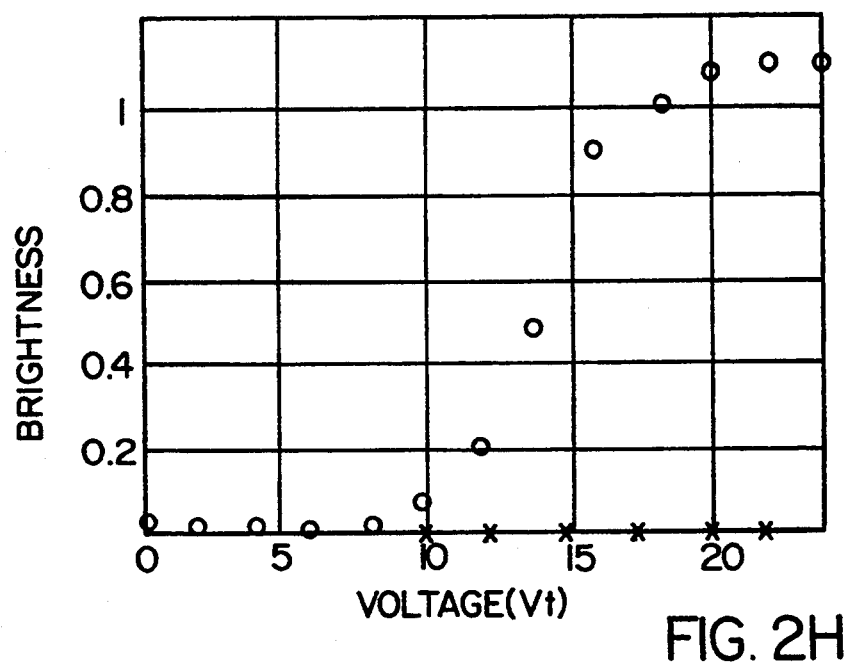
Figure 4:
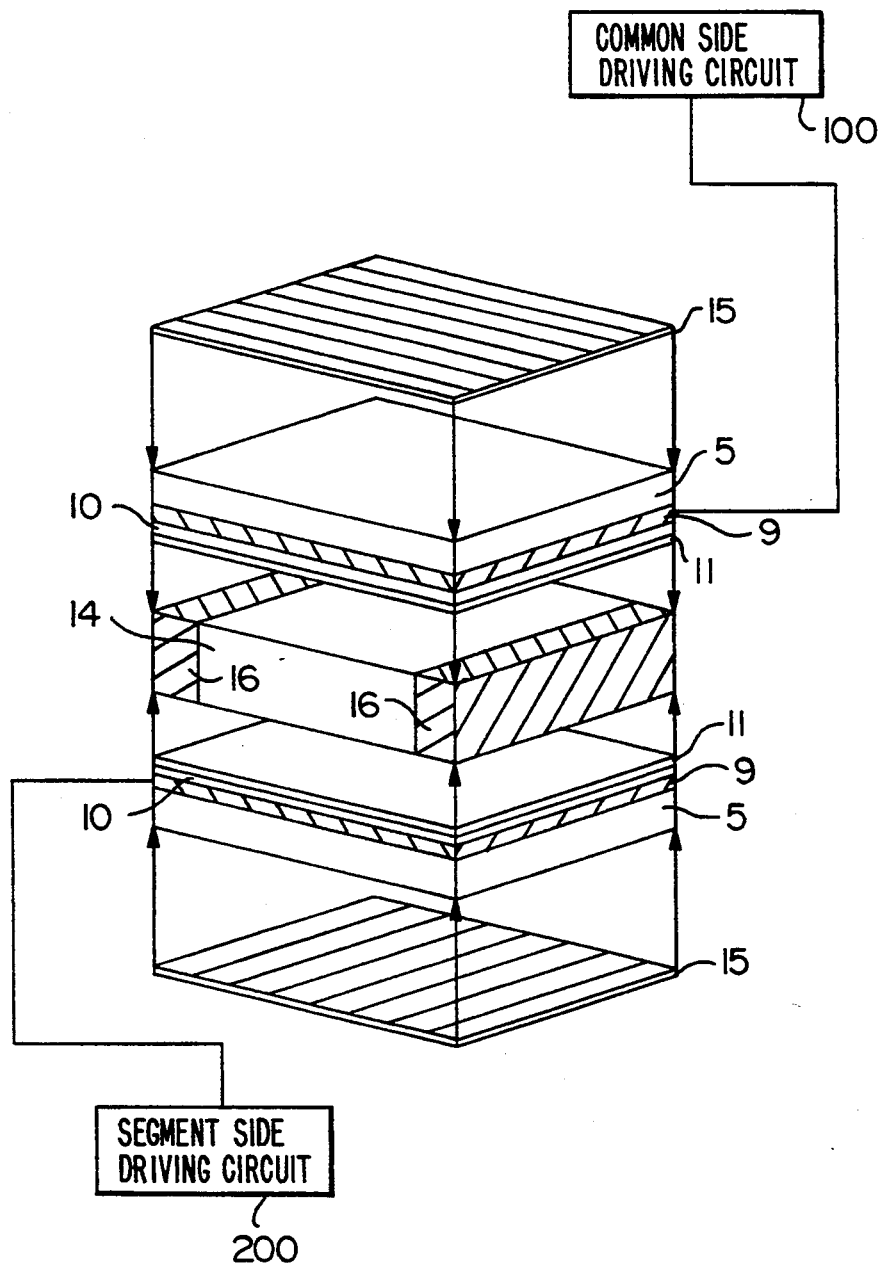
FIG. 4 is a diagrammatic view of a common ferroelectric liquid crystal panel, and FIG. 5(a& b) shows graphs explaining threshold characteristics evaluation waveforms and changes of the brightness.
Figure 5A:
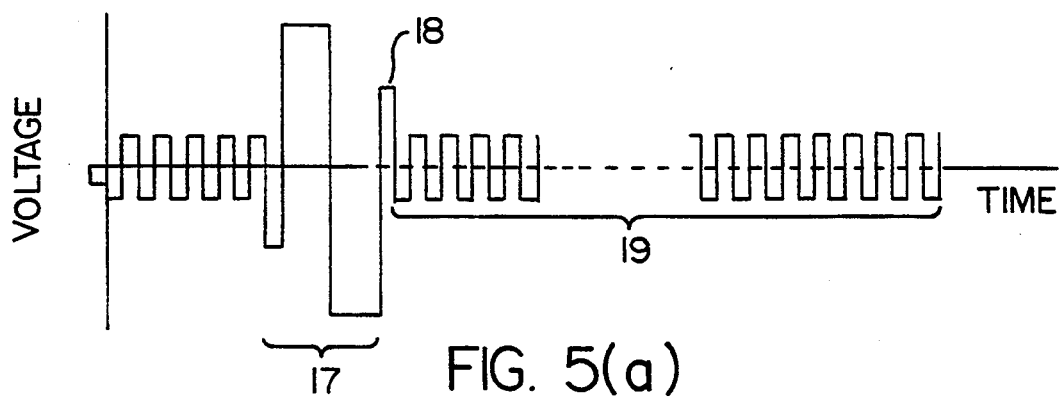
Figure 5B:
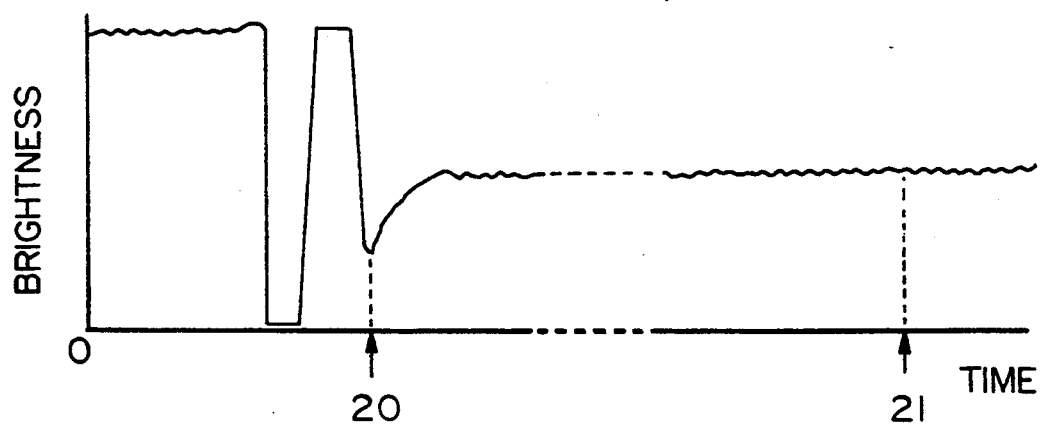

A constitution of the ferroelectric liquid crystal display panel, which has been made as a present example and which has been studied, is shown in FIG. 4. In FIG. 4, numeral 15 indicate polarizers, and 16 indicates spacers keeping a cell thickness at a constant length. A voltage is applied to the liquid crystal by driving circuits 100 and 200 at a common and a segment sides. The present invention should not be limited to the ferroelectric liquid crystal display device of this type of constitution, and the one or no polarizer can be used. An insulating layer can also be inserted under the transparent electrodes 9. A minimum constitution further requires, substrates for both surfaces, transparent electrodes for applying an electric field, and a liquid crystal layer. The ferroelectric liquid crystal composition is filled in the panel of such constitution, and then measured are the threshold characteristics, matrix characteristics, conditions of the molecular alignment, and the resistivity. In FIGS. 5(a) and (b), an application waveform used for measuring the threshold characteristics (in (a)) and a typical changing process of the brightness (in (b)) are shown. 17 indicates a reset pulse which has a pulse width 4 times wider than that of a selecting pulse. 18 indicates a practical writing pulse for measuring the threshold, and this pulse varies from $-30V$ to $+30V$. 19 indicates a nonselecting pulse which is kept at 2V while the measuring is performed. In FIG. 5(b), 20 indicates a minimum (maximum) brightness at applications of the electric field when the selecting pulse 18 is applied, and corresponds to "o" in FIGS. 2E-2H. 21 indicates the brightness at a memory condition after scanning 10000 lines, and corresponds to "x" in FIGS. 2E-2H. In a cell which shows a fair switching between the uniform states, changes of the brightness at the memory condition, in other words, changes of "x" in FIGS. 2E-2H to the applied voltage are drastic and steep, and are sufficient as shown in FIG. 2E (a). As a matrix waveform, a waveform of 4 pulse method proposed by Wakita et al (National Technical Report Vol. 33 No. 1 P44 1987) is used. Taking into account dazzling, the pulse width of the reset pulse is made the same as that of the selecting pulse.

EXAMPLE 1

The alignment layer made of an oblique evaporation layer of SiO is formed, by a vacuum evaporating apparatus, on surfaces of the upper and lower glass substrates which have transparent electrodes fixed thereto. The evaporation angle is 83 degrees, and the layer thickness is 2000Å.) Then an oblique evaporation cell with a thickness of 2 μm is formed between the upper and lower substrates so as to make the directions of the evaporation at the upper and lower substrate parallel with each other. Ferroelectric liquid crystal composition added with quinoline at 0.05 to 5 wt % is injected into this cell, and a comparison is made with one into which is injected a ferroelectric liquid crystal composition add with no quinoline added. Liquid crystals used for the comparison are two, A and B, of different mixtures. Characteristics of the materials are shown as follows:

Liquid crystal A

Spontaneous polarization; 20 $nC/cm^2$, tilt angle 24°

Liquid crystal B

Spontaneous polarization; 19 nC/cm$^2$, tilt angle 20°

The state of the molecular alignment of the ferroelectric liquid crystal with no quinoline is a twist state as a primary state no matter which kind the liquid crystal is. The threshold characteristics show only the switchings between the twist states in the liquid crystal A, but shows fair switchings between the uniform states in the liquid crystal B. But when the driving pulse of 4 pulse method is applied at an actual matrix drive, only switchings between the twist states are seen in any kind of the liquid crystals. In addition, the cell with the liquid crystal B, which shows good threshold characteristics between the uniform states at the beginning, starts showing only the switchings between the twist states after being left in one uniform state for a long time.

Next, the characteristics of the liquid crystal with added quinoline are examined, and following improvements are achieved compared with one with no quinoline.

(1) Both the liquid crystals A and B have two uniform states as a primary molecular alignment state.

(2) The threshold characteristics of the liquid crystal A show the switchings between the uniform states.

(3) Both the liquid crystals A and B have the fair switchings between the uniform states when the driving waveform of 4 pulse method is applied at the matrix drive.

(4) The resistivities of both the liquid crystals A and B become 1 order higher compared with the ones with no quinoline. $(1.6 \times 10^{-10} \rightarrow 1.7 \times 10^{-11})$.

(5) A deterioration of the threshold characteristics because of being left alone for a long time is eliminated.

The above effects do not especially depend upon an amount of addition. A ferroelectric liquid crystal display device using these liquid crystal composition with added quinoline shows good display characteristics without any dazzling for a long time.

Some experiments using following additives instead of quinoline are also performed.

12 crown 4, 15 crown 5, 18 crown 6, ethyleneglycol dimethylether, triethleneglycol dimethylether, 4 phenylpyrimidine, 8 oxiquinoline, 1. 10-phenanthroline, naphthoquinoline, and quinoxaline. As a material having a structure similar to the liquid crystal, the following compound is compound:

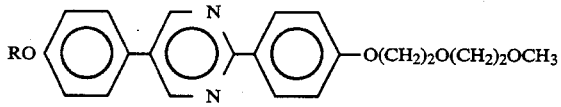

In the formula, R stands for an alkyl group. If these kinds of compound are added to both the liquid crystals A and B at 1%, exactly the same effects as with quinoline can be achieved.

EXAMPLE 2

An organic alignment layer is applied on upper and lower glass substrates having transparent electrodes and is hardened, and then a surface thereof is rubbed in one axis. Then a rubbing cell with a thickness of 2 μm is formed so that directions of rubbing of the upper and lower substrates are not parallel. This cell is filled with the ferroelectric liquid crystal composition to which quinoline is added at 0.05 to 5 wt %, and a comparison is made with one into which the ferroelectric liquid crystal composition with no quinoline is injected. The liquid crystal B is used. In the cell using the rubbing of the organic layer, being different from the oblique evaporation cell, the primary state of molecular alignment shows two uniform states without any additives and also shows the switchings between the uniform states no matter how wide the width of the reset pulse is. The resistivity is primarily high. However, one uniform state becomes stabilized after being kept in the same one uniform state for a few days, and a bistability disappears. On the contrary, when the 4 pulse waveform at the matrix drive is applied to the rubbing cell in which the liquid crystal B with 0.05 to 5 wt % quinoline has been filled and which is left in one uniform state for a week, good switchings between the uniform states is observed just as observed at the beginning.

The same experiments using the following additives instead of quinoline are also performed.

12 crown 4, 15 crown 5, 18 crown 6, ethyleneglycol dimethylether, triethleneglycol dimethylether, 4 phenylpyrimidine, 8 oxiquinoline, 1. 10-phenanthroline, naphthoquinoline, and quinoxaline. As a material having a structure similar to the liquid crystal, the following compound is employed:

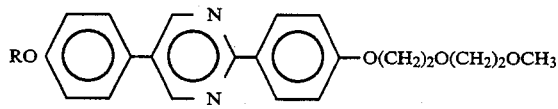

In the formula, R stands for an alkyl group. If compound of these kinds of compounds are added to the liquid crystal B at 1%, exactly the same effects as with quinoline can be achieved.

EXAMPLE 3

An oblique evaporation layer is formed, by a vacuum evaporating apparatus, on surfaces of upper and lower glass substrates which have the transparent electrodes fixed thereto. (The evaporation angle is 83 degrees, and the layer thickness is 2000Å.) Then an oblique evaporation cell a thickness of 2 μm is formed between the upper and lower substrates so as to make directions of the evaporation of the upper and lower substrates parallel with each other. This cell is left alone in a closed container filled with vapor of quinoline for 2 hours, and quinoline is diffused on surfaces of an inorganic alignment layer made of SiO. Then the liquid crystals A and B are filled in the cells, and characteristics of this type of cell are examined. This liquid crystal cell shows the following improvements compared with ones having no quinoline dispersed on the surfaces of the alignment layer.

(1) Both the liquid crystals A and B have two uniform states as the primary molecular alignment state.

(2) The threshold characteristics of the liquid crystal A show switchings between the uniform states.

(3) Both the liquid crystals A and B show good switchings between the uniform states when the driving waveform of 4 pulse method is applied at the matrix drive.

(4) The resistivities of both the liquid crystals A and B become 1 order higher compared with the ones with no quinoline.

(5) The deterioration of the threshold characteristics because of being left alone for a long time is eliminated.

A ferroelectric liquid crystal display device using this liquid crystal cell having quinoline diffused thereon shows good display characteristics for a long time.

The same experiments using the following additives instead of quinoline are also performed.

12 crown 4, 15 crown 5, 18 crown 6, ethyleneglycol dimethylether, triethleneglycol dimethylether, 4 phenylpyrimidine, 8 oxiquinoline, 1. 10-phenanthroline, naphthoquinoline, and quinoxaline. As a material having a structure similar to the liquid crystal, the following compound is employed:

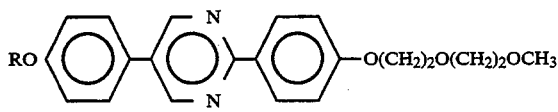

(In the formula, R stands for an alkyl group.)

Among the above compounds, a compound of low volatility has to be heated to be vaporized, and a vapor of the compound is filled in the container, so that the vapor comes into contact with the surfaces of the alignment layer and the compound is diffused on the surfaces of the alignment layer. All of these can bring about the same effects as with the use of quinoline.

EXAMPLE 4

An oblique evaporation layer is formed, by a vacuum evaporating apparatus, on surfaces of upper and lower glass substrates which have the transparent electrodes fixed thereto. (The evaporating angle is 83 degrees, and the layer thickness is 2000Å) Then hexane having 1-10 wt % of quinoline is spin-coated on the surface of these substrates. A solvent is removed later, and an oblique evaporation cell of 2 μm thickness is formed between the upper and lower substrates so that the directions of the oblique evaporation at the upper and lower substrates become parallel with each other. Then the liquid crystals A and B are injected into the cells, and characteristics of this type of the cell are studied. This liquid crystal cell has the following improvements compared with the ones having no quinoline diffused on the alignment layer's surfaces.

(1) Both the liquid crystals A and B have two uniform states as the primary molecular alignment state.

(2) The threshold characteristics of the liquid crystal A show switchings between the uniform states.

(3) Both the liquid crystals A and B show good switchings between the uniform states when the driving waveform of 4 pulse method is applied at the matrix drive.

(4) The resistivities of both the liquid crystals A and B become 1 order higher compared with the ones with no quinoline.

(5) The deterioration of the threshold characteristics because of being left alone for a long time is eliminated.

A ferroelectric liquid crystal display device using this liquid crystal cell having quinoline diffused thereon shows good display characteristics for a long time.

The same experiments using the following additives instead of quinoline are also performed.

12 crown 4, 15 crown 5, 18 crown 6, ethyleneglycol dimethylether, triethleneglycol dimethylether, 4 phenylpyrimidine, 8 oxiquinoline, 1. 10-phenanthroline, naphthoquinoline, and quinoxaline. As a material having a structure similar to the liquid crystal, the following compound is employed:

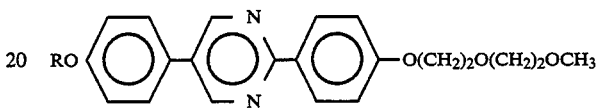

(In the formula, R stands for an alkyl group.)

In addition, it is also possible to form the alignment layer using materials to which the above compounds are added. The effects are totally the same.

The present invention should not be limited to the present examples.

What is claimed is:

1. A ferroelectric liquid crystal display device comprising a pair of substrates which have been subjected to an alignment treatment to form alignment layers thereon and which have voltage applying means, and a ferroelectric liquid crystal between said substrates, wherein 1 to 10 weight % of an organic crown ether which is soluble in the liquid crystal and traps ions or lowers conductivity of the liquid crystal is diffused in said alignment layers.

2. A ferroelectric liquid crystal composition which comprises a liquid crystal material having a ferroelectric liquid crystal phase, and 0.05 to 5 weight % of an organic crown ether which is soluble in the liquid crystal material and traps ions or lowers conductivity of the liquid crystal material.

3. A ferroelectric liquid crystal display device comprising a pair of substrates which have been subjected to an alignment treatment and which have voltage applying means, and a ferroelectric liquid crystal composition between said substrates, said composition comprising a ferroelectric liquid crystal material and 0.05 to 5 weight % of an organic crown ether which is soluble in the liquid crystal material and traps ions or lowers conductivity of the liquid crystal material.

* * * * *